United States Patent Office 3,723,133
Patented Mar. 27, 1973

3,723,133
METHOD OF PREPARING A DEHYDRATED DEACIDIFIED CITRUS JUICE PRODUCT
Robert E. Berry and Charles J. Wagner, Jr., Winter Haven, Fla., assignors to the United States of America as represented by the Secretary of Agriculture
No Drawing. Filed Feb. 7, 1972, Ser. No. 224,281
Int. Cl. A23l 1/02
U.S. Cl. 99—105        1 Claim

ABSTRACT OF THE DISCLOSURE

A dehydrated deacidified citrus juice product and the method of preparing said product are disclosed. The method comprises processing citrus juices so as to obtain a low acid dehydrated product of relatively high Brix to acid ratio. The product is powdery, anhydrous, and is useful in blending with other products to lower acidity and improve quality.

A non-exclusive, irrevocable, royalty-free license in the invention herein described, throughout the world for all purposes of the United States Government, with the power to grant sublicenses for such purposes, is hereby granted to the Government of the United States of America.

This invention relates to food products prepared from citrus juices. More specifically, this invention relates to new products derived from citrus fruits which are normally acid in character. By the method of this invention the fruit juices are deacidified and converted to a dehydrated form. In this form the new product can be mixed with other acid citrus products to produce a blend in either liquid or dehydrated powder form thereby converting the unacceptable product to one with lower acidity and commercial acceptability.

Citrus fruit juices and products are currently manufactured by commercial methods from fruit which varies in maturity and flavor quality throughout the processing season. Thus, there are early fruit products which are rather high in acidity in October and lower in acidity in November and December, mid-season varieties which are high in acidity in December and January and lower in acidity in subsequent months, and late season varieties which are high in acidity until about March or April and become progressively lower in acidity until June. As a consequence of these variations in natural characteristics of available fruit, juices and products from these fruits vary in acid content during the season. High acidity products in general are not considered to be of the best quality for consumption. Quality is affected to a large extent by the Brix/acid ratio.

Methods used in the past for adjusting Brix/acid ratio have included blending of late season varieties with early season varieties or blending of synthetic products such as sugar or neutralizing bases with the juice products. These are of a disadvantage in cases where it is desirable to minimize unnatural additives and promote the attributes of citrus as a natural product.

F. E. Nelson et al. devised a method whereby acidity in grapefruit products would be lowered by partial neutralization with calcium hydroxide, the precipitate removed, and the clarified partially deacidified juice would be blended with high acid grapefruit juice to adjust their acidity. This was reported in "Application of New Processing Techniques to Desert Grapefruit Products," In the Abstracts of USDA Citrus Research Conference, Pasadena, Calif., p. 17, Dec. 3, 1968.

U.S. Pats. 2,981,629 and 3,093,488, respectively a "Process of Dehydrating Foams" and the "Preparation of Stable Dehydrated Products," disclose recent technology advances in dehydration methods, particularly foam-mat drying, and have now made it possible and feasible to prepare dehydrated solids from high-sugar-containing materials such as citrus juices, in an economical manner commercially.

If the deacidified juice of the type previously studied could now be converted to a dehydrated form, this would give it a higher degree of storage stability and lessen weight and storage requirements and cost. This dehydrated product then could be made available for blending with other juices and products to adjust their acidity without adding any unnatural ingredients. In all such cases the material blended would be of a natural consistency and only trace amounts of artificial or synthetic material would be included.

In general, this invention can be described as a new citrus product prepared from deacidified orange juice which is dehydrated then blended with high-acid products. The method, briefly, consists of obtaining single strength orange juice or other citrus juice, centrifuging to remove suspended solids, neutralizing the clarified supernatant with calcium or other suitable metal hydroxide, recentrifuging to remove the precipitated calcium citrate or other metal citrate, recombining with originally removed suspended solids, concentrating this deacidified whole juice and dehydrating the resultant concentrate. The resultant dried deacidified powder is then blended with high acid orange juice, or other selected high acid juice, from early season fruit, immature fruit, orange concentrate of relatively low Brix to acid ratio, and high acid dehydrated powders.

For example, a single strength orange juice was prepared from frozen concentrate orange juice by the addition of water to form a 12.5° Brix solution (same density as aqueous 12.5% sucrose solution) with a Brix/acid ratio of 16.7:1. This juice was centrifuged at 4,000 r.p.m. using a pilot model basket centrifuge with a three minute process cycle, ten seconds flush, operate 0.5 second and feed 25 seconds. After centrifugation of the serum was pasteurized by heating it to 191° F. at ½ gallon per minute. This pasteurized serum was stored in a cold wall tank. The sludge separated during the first centrifugation was stored in closed containers at 40° F.

Dry, finely divided calcium hydroxide was added to the centrifuged serum at the rate of 0.33 gram $Ca(OH)_2$ to 80 grams of single strength serum. This was allowed to stand with stirring for several hours, then the solution was screened through a 60 mesh (U.S. Sieve Size) screen to remove undissolved calcium hydroxide. Additional finely divided calcium hydroxide was added to adjust the pH to about 7.0. This was centrifuged under same conditions as before. The precipitate of calcium citrate removed during this centrifugaiton was discarded. The neutralized clarified serium was mixed with the "suspended solids" sludge which had been separated during the first centrifugation. Before this mixing, the pH of the serum was 6.8, and after mixing the suspended solids back into the juice the pH was lowered to 6.5. This neutralized recombined citrus juice was then concentrated on a high vacuum falling film evaporator to 51.5° Brix and mixed with the appropriate amount of foaming agent and dried by foam-mat drying.

The resultant dry product was evaluated in several different ways. A small portion of it was reconstituted with water to form a juice of about 12° Brix. This was tasted by a panel of five members and judged to be very low in acidity, mild and bland and tasted somewhat like papaya juice or peach juice. In another test, a sample of orange juice powder prepared from a highly acid concentrate when reconstituted with water to a 12.5° Brix juice resulted in a solution having pH 3.44, and containing 1.427 g. citric acid/100 g. of juice. The Brix/acid ratio of this material was 8.76/1.0. When this dried powder was mixed with the deacidified orange juice powder in the ratio of two parts acid juice powder to one part deacidified juice powder, and the dry mixture was reconstituted to 12.5° Brix by the addition of water, the resultant juice had pH 3.9, contained 0.95 g. citric acid per 100 g. juice and the Brix/acid ratio was 13.16 to one. When this was compared to the reconstituted juice from the original powder by a taste panel, the sample containing the added deacidified juice powder was judged to be very greatly improved in organoleptic quality.

In another example single strength fresh orange juice was prepared from immature Valencia oranges. The pH of this juice was 3.25, it contained 1.736 g. citric acid/100 g. juice, and had a Brix/acid ratio of 7.19 to 1. When this immature Valencia juice was mixed with deacidified instant orange juice in the ratio of two parts green Valencia juice to one part deacidified juice powder and the resultant solution adjusted by the addition of water to 12.5° Brix solution, the resultant juice had pH 3.73, contained 1.097 g. citric acid/100 g. juice, and had a Brix/acid ratio of 11.39 to 1. This sample was also judged by the taste panel to be much more palatable and an acceptable product whereas the original green Valencia juice from which it had been made had been judged entirely unpalatable.

Tests on the deacidified juice powder itself, when reconstituted to 12.5° Brix solution with the addition of water, indicated pH 6.57 and a citric acid content of 0.009 g./100 g. juice.

Thus, in four different examples this deacidified juice powder has been shown entirely acceptable as a juice product where decreased acidity is desired. It could be blended with either liquid or dried form orange juice products of high acidity to lower their acidity without the addition of synthetic materials and without the use of food additives. The only unnatural component involved is a very small percentage of methylcellulose, a completely inert ingredient, added as a foaming agent to assist in the dehydration process. This ingredient is present in the final juice as consumed in a concentration of approximately 150 p.p.m. or less.

Modifications which can be employed

Similar treatments could be applied to almost any citrus juice and any other sugar containing juice which varies from time to time in acid content. These would include lemon, lime, grapefruit, pineapple, plum and grape. The deacidified juice powder could also be blended with other types of food ingredients such as high protein powders or tablets or dehydrated milk powder which might not be compatible with high acid fruit powders.

We claim:

1. A method of preparing a dehydrated deacidified citrus juice product which is useful for blending with other products to lower acidity and improve quality, the method comprising:
   (a) centrifuging the juice from a sour-juice-producing citrus fruit to separate the serum from the sludge (heavier particles) and storing the sludge at about 40° F.,
   (b) pasteurizing the serum upon heating at about 191° F. and at a rate of ½ gallon per minute and storing the pasteurized serum to allow it to cool,
   (c) adding dry, finely divided calcium hydroxide at a rate of about 0.00413 gram of $Ca(OH)_2$ for every gram of single strength serum then allowing the solution to stand with occasional stirring for about 1–2 hours during which time calcium citrate precipitates,
   (d) passing the solution through a 60 mesh screen to remove any undissolved calcium hydroxide,
   (e) adjusting the pH of the solution of (d) to about 7.0,
   (f) centrifuging the solution as in (a) to separate the neutralized, clarified serum from calcium citrate,
   (g) recombining the serum of (f) with the sludge of (a) thus lowering the pH of the serum from about 6.8 to about 6.5,
   (h) concentrating the neutralized recombined citrus juice on a high vacuum falling film evaporator to 51.5° Brix,
   (i) mixing the juice from (h) with about 0.5% (solids basis) of a foaming agent, and
   (j) foam-mat drying the product to obtain, as a dry powder a dehydrated deacidified citrus juice product.

References Cited
UNITED STATES PATENTS

| | | | |
|---|---|---|---|
| 1,141,458 | 6/1915 | Gore | 99—205 |
| 2,567,038 | 9/1951 | Stevens et al. | 99—155 |
| 2,614,048 | 10/1952 | Wenzelberger | 99—155 |
| 2,928,744 | 3/1960 | Ponting | 99—105 |
| 2,981,629 | 4/1961 | Ginnette et al. | 99—205 |
| 3,114,641 | 12/1963 | Sperti et al. | 99—105 |

NORMAN YUDKOFF, Primary Examiner

K. P. VAN WYCK, Assistant Examiner

U.S. Cl. X.R.

99—205